(12) United States Patent
Rideau

(10) Patent No.: US 10,384,799 B2
(45) Date of Patent: Aug. 20, 2019

(54) METHOD AND SYSTEM FOR GENERATING AUXILIARY POWER IN AN AIRCRAFT

(71) Applicant: Microturbo, Toulouse (FR)

(72) Inventor: Jean-Francois Rideau, Tournefeuille (FR)

(73) Assignee: SAFRAN POWER UNITS, Toulouse (FR)

(*) Notice: Subject to any disclaimer, the term of this patent is extended or adjusted under 35 U.S.C. 154(b) by 265 days.

(21) Appl. No.: 15/032,782

(22) PCT Filed: Oct. 29, 2014

(86) PCT No.: PCT/FR2014/052748
§ 371 (c)(1),
(2) Date: Apr. 28, 2016

(87) PCT Pub. No.: WO2015/063414
PCT Pub. Date: May 7, 2015

(65) Prior Publication Data
US 2016/0264252 A1 Sep. 15, 2016

(30) Foreign Application Priority Data
Oct. 31, 2013 (FR) .................................. 13 60732

(51) Int. Cl.
*B64D 41/00* (2006.01)
*F01D 19/00* (2006.01)
(Continued)

(52) U.S. Cl.
CPC ............. *B64D 41/00* (2013.01); *F01D 19/00* (2013.01); *F02C 7/26* (2013.01); *F02C 7/32* (2013.01);
(Continued)

(58) Field of Classification Search
CPC ............. B64D 41/00; B64D 2041/002; F05D 2220/50
See application file for complete search history.

(56) References Cited

U.S. PATENT DOCUMENTS

| 2,941,790 A | 6/1960 | Compton et al. |
| 4,642,997 A * | 2/1987 | Krafka ................... B64D 13/06 62/402 |

(Continued)

FOREIGN PATENT DOCUMENTS

| EP | 2554482 | 2/2013 |
| GB | 2020367 | 11/1974 |

OTHER PUBLICATIONS

International Search Report and Written Opinion with English Language Translation, dated Apr. 2, 2015, Application No. PCT/FR2014/052748.

(Continued)

*Primary Examiner* — Philip J Bonzell
(74) *Attorney, Agent, or Firm* — Womble Bond Dickinson (US) LLP

(57) ABSTRACT

The invention concerns a method for generating auxiliary power in an aircraft, comprising the step consisting of: starting up an auxiliary power unit (6) of the aircraft by supplying compressed air to the auxiliary power unit (6) from a supercharger (7), and transferring non-propulsive energy from the auxiliary power unit (6) to the aircraft. The invention also concerns a system (5) for generating auxiliary power in an aircraft and an aircraft implementing such a method.

9 Claims, 3 Drawing Sheets

Figure 1:
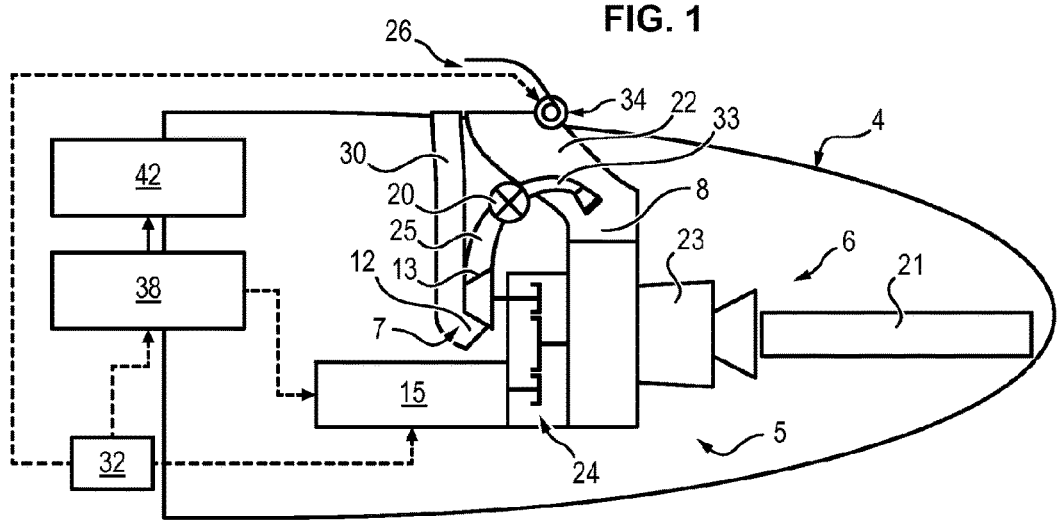

(51) Int. Cl.
*F02C 7/26* (2006.01)
*F02C 7/32* (2006.01)
*F04B 35/06* (2006.01)
*F04C 18/02* (2006.01)
*F04C 18/16* (2006.01)
*F04C 23/02* (2006.01)

(52) U.S. Cl.
CPC .......... *F04B 35/06* (2013.01); *F04C 18/0215* (2013.01); *F04C 18/16* (2013.01); *F04C 23/02* (2013.01); *B64D 2041/002* (2013.01); *F05D 2220/50* (2013.01)

(56) References Cited

U.S. PATENT DOCUMENTS

| | | | | |
|---|---|---|---|---|
| 5,201,798 | A * | 4/1993 | Hogan | B64D 41/00 60/39.15 |
| 5,309,708 | A * | 5/1994 | Stewart, Jr. | B64D 41/00 60/39.15 |
| 5,343,778 | A * | 9/1994 | Romero | B64D 41/00 60/39.15 |
| 5,555,722 | A * | 9/1996 | Mehr-Ayin | B64D 41/00 123/179.28 |
| 5,845,479 | A | 12/1998 | Nakhamkin et al. | |
| 6,247,668 | B1 * | 6/2001 | Reysa | B64D 41/00 244/53 B |
| 6,651,929 | B2 * | 11/2003 | Dionne | B64D 33/08 165/44 |
| 6,735,951 | B2 * | 5/2004 | Thompson | F02C 9/28 60/774 |
| 6,941,760 | B1 | 9/2005 | Jones | |
| 6,942,181 | B2 * | 9/2005 | Dionne | B64D 33/08 165/44 |
| 7,364,117 | B2 * | 4/2008 | Dionne | B64D 33/08 244/58 |
| 9,644,538 | B2 * | 5/2017 | Dionne | F02C 7/14 |
| 2008/0245062 | A1 * | 10/2008 | Dionne | B64D 33/08 60/320 |
| 2010/0293961 | A1 | 11/2010 | Tong et al. | |
| 2012/0180498 | A1 * | 7/2012 | Francisco | F01D 17/06 60/783 |
| 2014/0130510 | A1 * | 5/2014 | Bouldin | F02C 7/14 60/782 |
| 2014/0182306 | A1 * | 7/2014 | Castagnera | F28D 7/00 60/784 |
| 2014/0360547 | A1 * | 12/2014 | Ribarov | H02N 2/186 136/205 |
| 2015/0367952 | A1 * | 12/2015 | Rideau | B64D 33/02 244/58 |

OTHER PUBLICATIONS

French Search Report and Written Opinion, dated Aug. 25, 2014, French Application No. 1360732.

* cited by examiner

METHOD AND SYSTEM FOR GENERATING AUXILIARY POWER IN AN AIRCRAFT

FIELD OF INVENTION

The invention relates to a method and a system for generating auxiliary power in an aircraft.

PRESENTATION OF THE PRIOR ART

Certain aircraft, such as commercial or regional airplanes, are equipped with main engines serving for propulsion, and an auxiliary power unit (APU) including a gas turbine and designed to supply non-propulsive energy on the ground and in flight when the main engine(s) are not able to do so.

Certain aircraft certifications, like the ETOPS certification (Extended Range Twin Engine Operation Performance Standards) require a cold-start capacity of the auxiliary power unit at very high altitude (between 39,000 and 41,000 ft depending on the carriers).

The tendency is to increase this ceiling, with restarting requirements of the auxiliary power unit 6 at 43,000 ft, or even 45,000 ft.

At these altitudes, however, the density of the ambient air is low, the outside temperature is low and the quantity of fuel needed for starting is low and difficult to measure out.

The starting of the auxiliary power unit then becomes difficult and requires long and costly development phases.

In addition, it is difficult to maintain a starting window for a sufficient period of time to start the gas turbine of the auxiliary power unit.

Finally, the higher the altitude of the aircraft, the narrower is the starting window, and thus the more difficult to detect and maintain.

PRESENTATION OF THE INVENTION

The invention proposes a method for generating auxiliary power in an aircraft, including the steps consisting of starting an auxiliary power unit of the aircraft by supplying compressed air to the auxiliary power unit from a positive-displacement compressor, and transferring non-propulsive energy from the auxiliary power unit to the aircraft.

The invention is advantageously supplemented by the following features, taken alone or in any one of their technically possible combinations:
  starting the auxiliary unit includes supplying the auxiliary power unit with air coming only from the positive-displacement compressor;
  during a transitional phase, supplying the auxiliary power unit with air coming from the volumetric compressor and from the ambient air;
  during a subsequent step, supplying the auxiliary power unit only with ambient air.

The invention further relates to a system for generating auxiliary power in an aircraft, including an aircraft auxiliary power unit, including an air inlet, and being configured to supply non-propulsive energy to the aircraft to supplement or replace the main engines of the aircraft, and a volumetric compressor connected to the air inlet of the auxiliary power unit, the volumetric compressor being configured to supply compressed air at the inlet of the auxiliary power unit for starting said unit.

This system is advantageously supplemented by the following features, taken alone or in any of their technically possible combinations:
  the system includes a starter generator, configured to drive the volumetric compressor and the auxiliary power unit;
  the system includes a decoupling tool configured to decouple the volumetric compressor from a shaft of the auxiliary power unit;
  the system includes a valve for controlling flow between an air exhaust of the compressor and the air inlet of the auxiliary power unit;
  the volumetric compressor has an air flow rate comprised between 0.1 and 0.2 kg·s$^{-1}$, a rotation speed less than 10,000 rpm, power greater than or equal to 15 kW and a compression rate comprised between 5 and 10 bars.

The invention also relates to an aircraft including this system.

The invention offers numerous advantages.

The invention makes it possible to start the auxiliary power unit in an effective and controlled manner, even at very high altitudes. In addition, starting is faster and less costly that the systems of the prior art.

PRESENTATION OF THE FIGURES

Figure 2:
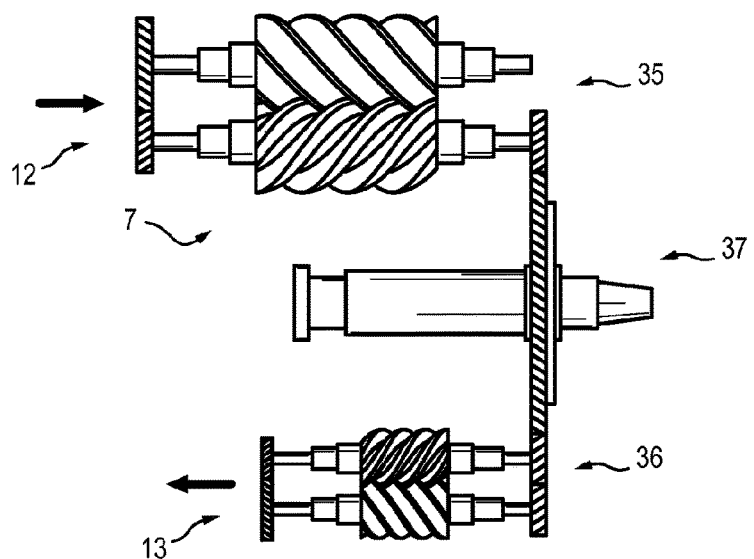
Figure 3:
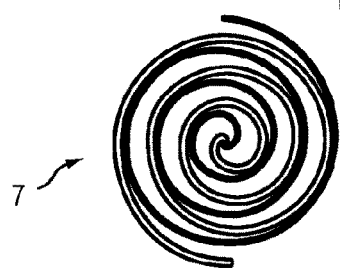
Figure 4:
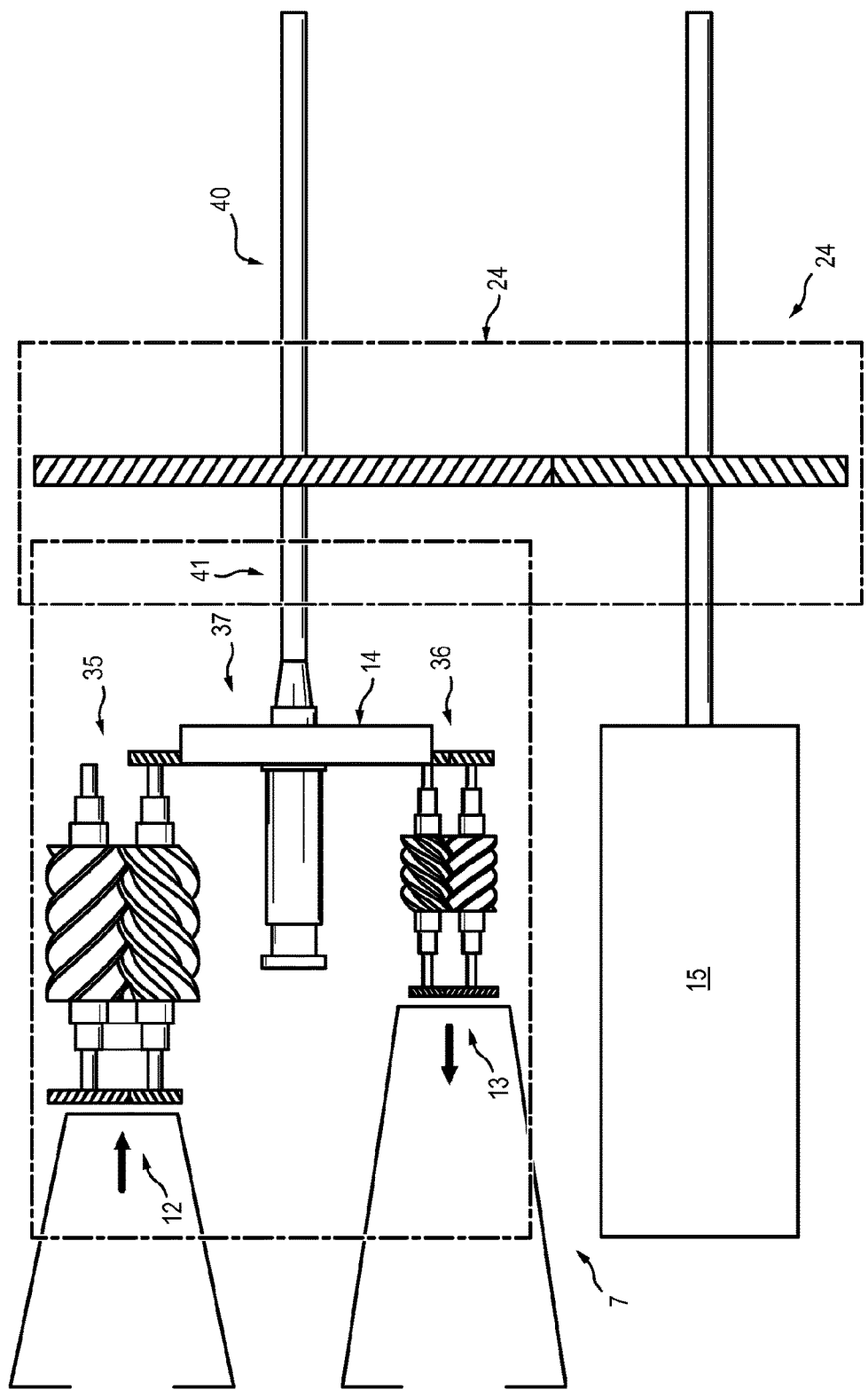
Figure 5:
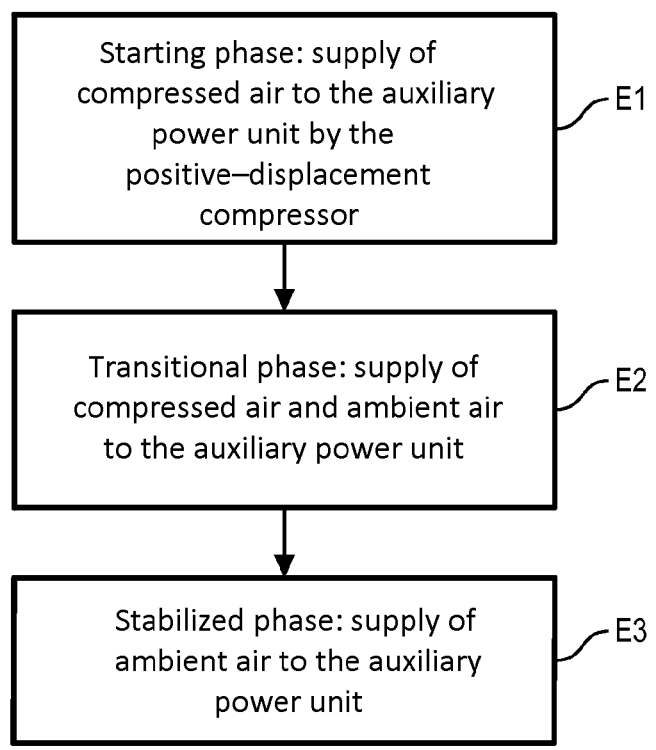

Other characteristics and advantages of the invention will still be revealed by the description that follows, which is purely illustrative and not limiting, and must be read with reference to the appended drawings wherein:
  FIG. 1 shows schematically the tail of an airplane including an auxiliary power generation system;
  FIG. 2 shows an example of the screw-type positive-displacement compressor;
  FIG. 3 shows an example of a scroll type positive-displacement compressor;
  FIG. 4 shows a starter generator connected to a volumetric compressor through an accessory box;
  FIG. 5 shows the steps in a method for generating auxiliary power in an aircraft.

DETAILED DESCRIPTION

System for Generating Auxiliary Power

FIG. 1 shows schematically a system 5 for generating auxiliary power for an aircraft. This system 5 is conventionally positioned at the tail 4 at the rear of the aircraft.

The system 5 includes an auxiliary power unit 6. The unit 6 conventionally includes a gas turbine 23, an air inlet 8 and an exhaust 21. The auxiliary power unit 6 is configured to supply non-propulsive energy to the aircraft, supplementing or replacing the main engines of the aircraft. For example, the auxiliary power unit 6 can be used to start the main engines, or to supply on-board equipment (air conditioning, pneumatic and hydraulic pressure, etc.).

In particular, the unit 6 is designed to supply energy on the ground and in flight when the main engines are not able to do so.

An air inlet channel 22 extends from the air inlet 8 to the outside, so as to connect this air inlet to the ambient air.

A door 26, controlled by a ram 34, extends in the interface between the entry to the channel 22 and the ambient air. This door 26 can completely or partially block the entry to the channel 22, and thus allow ambient air to pass in a variable manner toward the auxiliary power unit 6. If appropriate, the door 26 does not block the entry of the channel 22 and allows free circulation of ambient air toward the air inlet 8 of the unit 6.

The system 5 for generating auxiliary power further includes a volumetric compressor 7.

This compressor 7 includes an air inlet 12, connected by a pipe 30 to the ambient air. The compressor 7 further includes at least one air exhaust 13, through which it expels the compressed air.

The air exhaust 13 of the compressor 7 is connected to the air inlet 8 of the auxiliary power unit 6 through a channel 25 ending with a pump 33.

Thus, the volumetric compressor 7 is configured to supply compressed air at the inlet of the auxiliary power unit 6, for starting said unit 6.

The volumetric compressor 7 is for example, but without limitation, a reciprocating compressor or a rotary compressor.

Positive-displacement compressors have the advantage of being able to supply energetic air (that is, having adequate pressure in particular) even with low speeds of the movable parts of the compressor.

According to a particular example, this is a rotary single-shaft or multi-shaft screw-type (FIG. 2) or scroll type (FIG. 3) compressor.

In the case of a screw type compressor, it is advantageous to select a two-stage compressor, which uses air cooling. As illustrated in FIG. 2, the first stage 35 and the second stage 36 are connected by a freewheel 37.

It is advantageous to have a compressor 7 using air cooling. However, oil cooling can also be implemented, by connecting the compressor 7 to the oil circuit of the unit 6.

Optimal starting performance of the unit 6 can be obtained with a volumetric compressor having the following characteristics:
- an output air flow rate comprised between 0.1 and 0.2 $kg \cdot s^{-1}$,
- a speed of rotation (of the pumping mechanism) lower than 10,000 rpm,
- power greater than or equal to 15 kW;
- a compression rate comprised between 5 and 10 bars.

However, these values are not limiting and depend on the flight conditions, the starting altitude required, the performance required, of the unit 6, of the aircraft, etc.

The system 5 also includes a starter generator 15, which is generally a motor member electrically started, configured to drive the auxiliary power unit 6 and the volumetric compressor 7.

The starter generator 15 is connected to an accessory box 24, which includes a gear train making it possible to transmit mechanical power to various mechanical members, such as for example the lubrication module or the cooling fan. The volumetric compressor 7 is mechanically connected to the accessory box 24 which makes it possible to drive it.

As can be seen in FIG. 4, a shaft 40 of the unit 6 and a shaft 41 of the compressor 7 are driven by the accessory box 24.

To drive the volumetric compressor 7, the use of a starter generator is necessary because a conventional starter does not allow enough power to be delivered. In fact, a starter supplied by the 28V network is limited to 12 kW. While the minimum power of a volumetric compressor for an APU is on the order of 15 kW.

The starter generator 15 is electrically controlled by power electronics 38 of the system 5. These power electronics 38 are connected to the electrical grid 42 of the aircraft. The power electronics 38 is for its part controlled by a control unit 32 (ECU—"Electronic Control Unit").

The system 5 further includes a decoupling tool 14 configured to mechanically decouple the volumetric compressor 7 from the shaft 41 of the unit 6, beyond a threshold rotation speed of the volumetric compressor 7.

In other words, once the compressor 7 has reached a predetermined rotation speed, it no longer supplies compressed air at the output.

The tool 14 is for example a freewheel 37 which can decouple itself from shafts 40 and 41. The decoupling is automatically accomplished, as soon as the threshold rotation speed is reached.

According to one embodiment, the system 5 includes a flow control valve 20 between the air exhaust 13 of the compressor and the air inlet 8 of the auxiliary power unit 6. This valve 20 can in particular be positioned in the channel 25 connecting the air exhaust 13 of the compressor and the air inlet 8 of the auxiliary power unit 6.

This valve 20 makes it possible to regulate the air supply by the compressor 7 to that of the unit 6. In particular, given that the rotation speed of the compressor 7 conditions the pressure and the flow rate at the exit of the compressor 7, the valve 20 makes it possible to de-correlate the flow rate from the output pressure of the compressor 7.

Method for Generating Auxiliary Power in an Aircraft

A method for generating auxiliary power in an aircraft can be implemented thanks to the system 5 for generating auxiliary power described previously. The control of the method is accomplished by the control unit 32. A schematic of such a method is supplied in FIG. 5.

During a starting phase, the auxiliary power unit 6 is started (step E1) by receiving compressed air supplied by the volumetric compressor 7. In other words, the gas turbine begins to operate due to air supplied by the compressor 7.

The volumetric compressor 7, for its part, is started via the starter generator 15 by means of the accessory box 24, and makes it possible to supply energetic air at the inlet of the unit 6, even though the ambient air is cold and has low density at the altitude at which the aircraft is located (for example, an altitude higher than 41,000 ft). Thus the system 5 makes it possible to simulate a lower aircraft altitude, and thus to more easily start the unit 6.

The starter generator 15 also makes it possible to supply energy to the unit 6 when it is started, this supplying energy to a compressor of the auxiliary power unit 6.

During this starting phase, the auxiliary unit 6 is generally supplied with air coming only from the volumetric compressor 7. Consequently, the door 26, controlled by the ram 34, blocks the entry of the channel 22.

When starting the unit 6, it does not require a high flow rate, and the starting window, that is the parameters of the air supplied at the inlet of the unit 6 (richness, temperature, pressure, flow rate) must exist within controlled intervals.

After starting the gas turbine of the unit 6, the gas turbine begins to enter into a divergence regime. This regime can be qualified as transitional.

As the divergence progresses, more and more air is needed for the operation of the unit 6.

Consequently, the auxiliary power unit 6 is supplied with air coming from the volumetric compressor 7 and by ambient air (step E2) coming from outside the aircraft. This is therefore a mixed supply.

To this end, the door 26 is progressively opened so as to block the entry of the channel 22 only partially.

Operation of the ram 34 is controlled by the control unit 32 which opens the door 26 depending on the altitude of the aircraft and the rotation speed of the compressor 7.

When the rotation speed of the compressor 7 passes a threshold rotation speed, the auxiliary power unit 6 is supplied only with ambient air (step E3).

To this end, the decoupling tool 14 mechanically decouples the volumetric compressor 7 from the shaft of the unit 6, which implies that it no longer supplies compressed air at the inlet of the unit 6.

In addition, the door 26 is completely open, allowing the ambient air to freely penetrate into the channel 22 toward the inlet of the unit 6. This regime is a stabilized regime wherein the gas turbine of the unit 6 is in a stabilized regime.

The starter generator 15 then operates as a generator (and no longer as a starter).

If appropriate, the flow rate control valve 20 is operated so as to control the output flow rate of the compressor 7 without modifying the output pressure of the compressor 7. The flow rate of air at destination of the unit 6 is therefore decoupled from the pressure of the air at destination of the unit 6. The control thus includes an additional degree of freedom allowing a de-correlation of the air pressure from the air flow rate emitted by the compressor 7.

The system 5 for generating auxiliary power can in particular be implemented within an aircraft, as for example a commercial or regional airplane.

The invention claimed is:

1. A method for generating auxiliary power in an aircraft, comprising:
    starting a volumetric compressor via a starter generator,
    starting an auxiliary power unit of the aircraft by supplying compressed air to the auxiliary power unit from the volumetric compressor, and
    transferring non-propulsive energy from the auxiliary power unit to the aircraft.

2. The method according to claim 1, wherein starting the auxiliary power unit includes supplying the auxiliary power unit with air coming only from the volumetric compressor.

3. The method according to claim 1, including the step, during a transitional phase, supply the auxiliary power unit with air coming from the volumetric compressor and ambient air.

4. The method according to claim 1, including the subsequent step of supplying the auxiliary power unit only with ambient air.

5. A system for generating auxiliary power in an aircraft, including:
    an auxiliary power unit, including an air inlet, and being configured to supply non-propulsive energy to the aircraft supplementing or replacing the main engines of the aircraft,
    a volumetric compressor connected to the air inlet of the auxiliary power unit,
    the volumetric compressor being configured to supply compressed air at the inlet of the auxiliary power unit, for starting said unit, and
    a starter generator, configured to drive the volumetric compressor and the auxiliary power unit.

6. The system according to claim 5, wherein the volumetric compressor includes a decoupling tool configured to decouple the volumetric compressor of a shaft of the auxiliary power unit.

7. The system according to claim 5, including a valve for controlling the flow rate between an air exhaust of the compressor and the air inlet of the auxiliary power unit.

8. The system according to claim 5, wherein the volumetric compressor has:
    an output air flow rate comprised between 0.1 and 0.2 $kgs^{-1}$,
    a rotation speed of the mechanism less than 10,000 rpm,
    power great than or equal to 15 kW, and
    a compression rate comprised between 5 and 10 bars.

9. An aircraft including a system for generating auxiliary power according to claim 5.

* * * * *